(No Model.) 9 Sheets—Sheet 1.

G. E. HUNTER.
RECORDING MECHANISM FOR VIBRATORS FOR TESTING WATCH BALANCES AND HAIRSPRINGS.

No. 566,177. Patented Aug. 18, 1896.

Witnesses:
Jas. E. Hutchinson
Frank P. Prindle

Inventor.
George E. Hunter
by Prindle and Russell
his Attorneys (No Model.) 9 Sheets—Sheet 3.
G. E. HUNTER.
RECORDING MECHANISM FOR VIBRATORS FOR TESTING WATCH BALANCES AND HAIRSPRINGS.

No. 566,177. Patented Aug. 18, 1896.

Witnesses:
Frank P. Prindle.
Jas. E. Hutchinson.

Inventor:
George E. Hunter
by Prindle and Russell
his Attorneys.

(No Model.) 9 Sheets—Sheet 4.
G. E. HUNTER.
RECORDING MECHANISM FOR VIBRATORS FOR TESTING WATCH BALANCES AND HAIRSPRINGS.

No. 566,177. Patented Aug. 18, 1896.

Witnesses
Frank P. Prindle
Jas. E. Hutchinson

Inventor
George E. Hunter
by Prindle and Russell
his Attorneys (No Model.) 9 Sheets—Sheet 5.

G. E. HUNTER.
RECORDING MECHANISM FOR VIBRATORS FOR TESTING WATCH BALANCES AND HAIRSPRINGS.

No. 566,177. Patented Aug. 18, 1896.

Witnesses:
Jas. E. Hutchinson.
Frank P. Prindle.

Inventor.
George E. Hunter
by Prindle and Russell
his Attorneys.

(No Model.) 9 Sheets—Sheet 6.

G. E. HUNTER.
RECORDING MECHANISM FOR VIBRATORS FOR TESTING WATCH BALANCES AND HAIRSPRINGS.

No. 566,177. Patented Aug. 18, 1896.

Witnesses:
Jas. E. Hutchinson.
Frank P. Prindle.

Inventor.
George E. Hunter
by Prindle and Russell
his Attorneys (No Model.) 9 Sheets—Sheet 7.
G. E. HUNTER.
RECORDING MECHANISM FOR VIBRATORS FOR TESTING WATCH BALANCES AND HAIRSPRINGS.
No. 566,177. Patented Aug. 18, 1896.
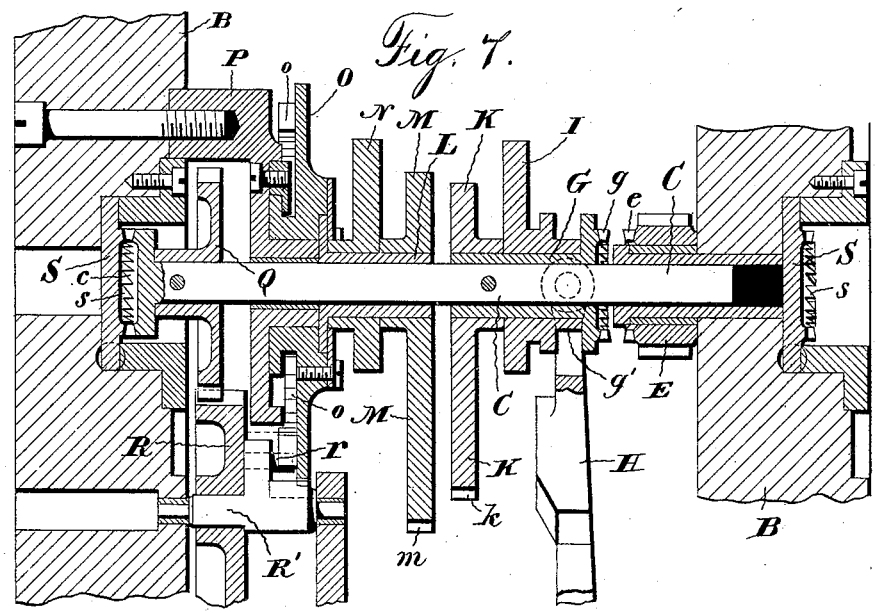
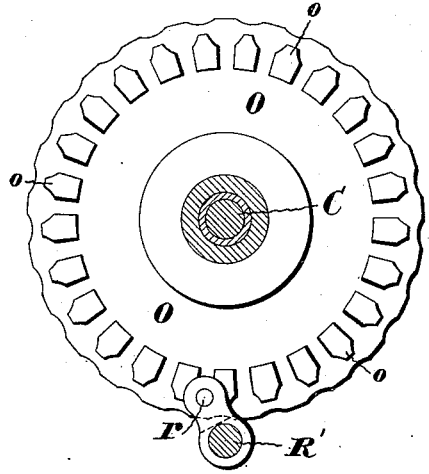
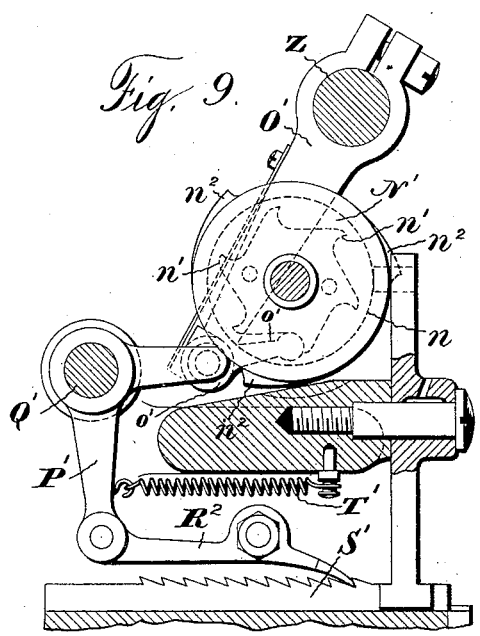
Witnesses:
Frank P. Prindle.
Jas. E. Hutchinson.
Inventor:
George E. Hunter
by Prindle and Russell
his Attorneys
THE NORRIS PETERS CO., PHOTO-LITHO., WASHINGTON, D. C.

(No Model.)
9 Sheets—Sheet 8.
G. E. HUNTER.
RECORDING MECHANISM FOR VIBRATORS FOR TESTING WATCH BALANCES AND HAIRSPRINGS.
No. 566,177.
Patented Aug. 18, 1896.
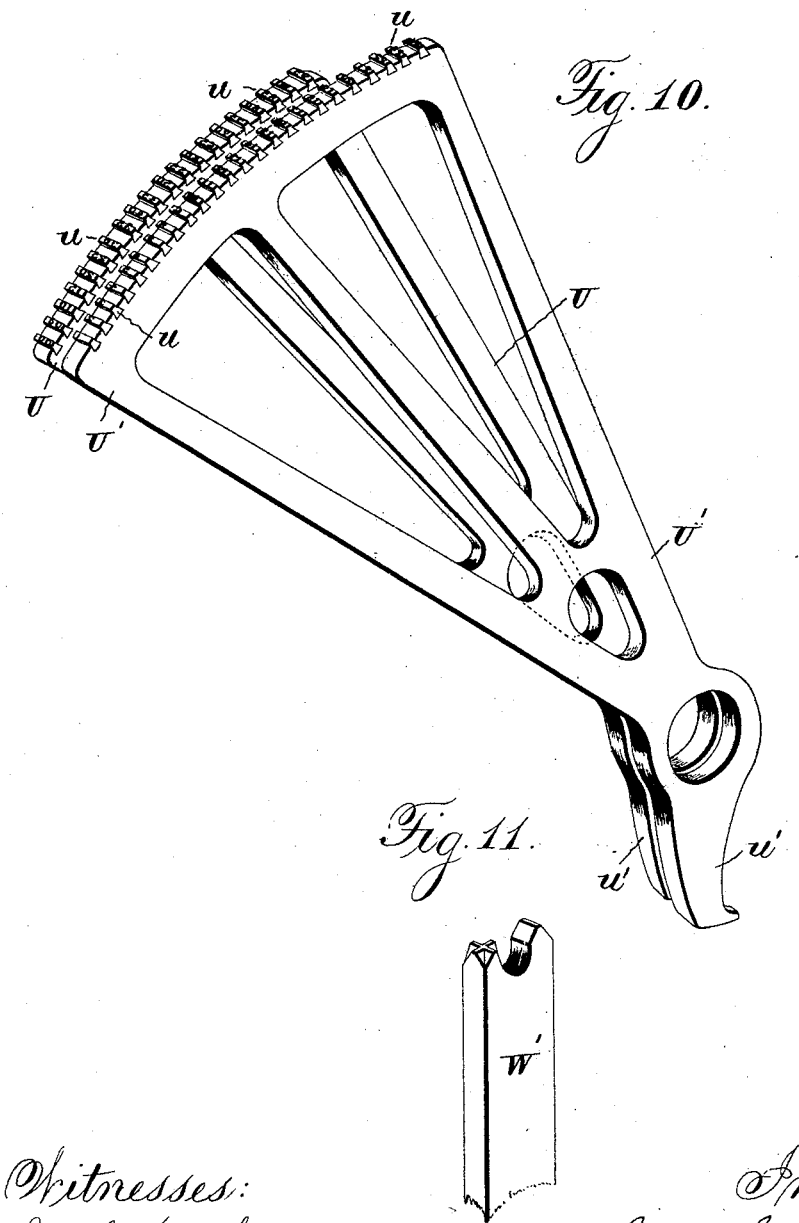
Witnesses:
Jas. E. Hutchinson.
Frank P. Prindle.
Inventor.
George E. Hunter
by Prindle & Russell
his attorneys (No Model.) 9 Sheets—Sheet 9.
G. E. HUNTER.
RECORDING MECHANISM FOR VIBRATORS FOR TESTING WATCH BALANCES AND HAIRSPRINGS.
No. 566,177. Patented Aug. 18, 1896.
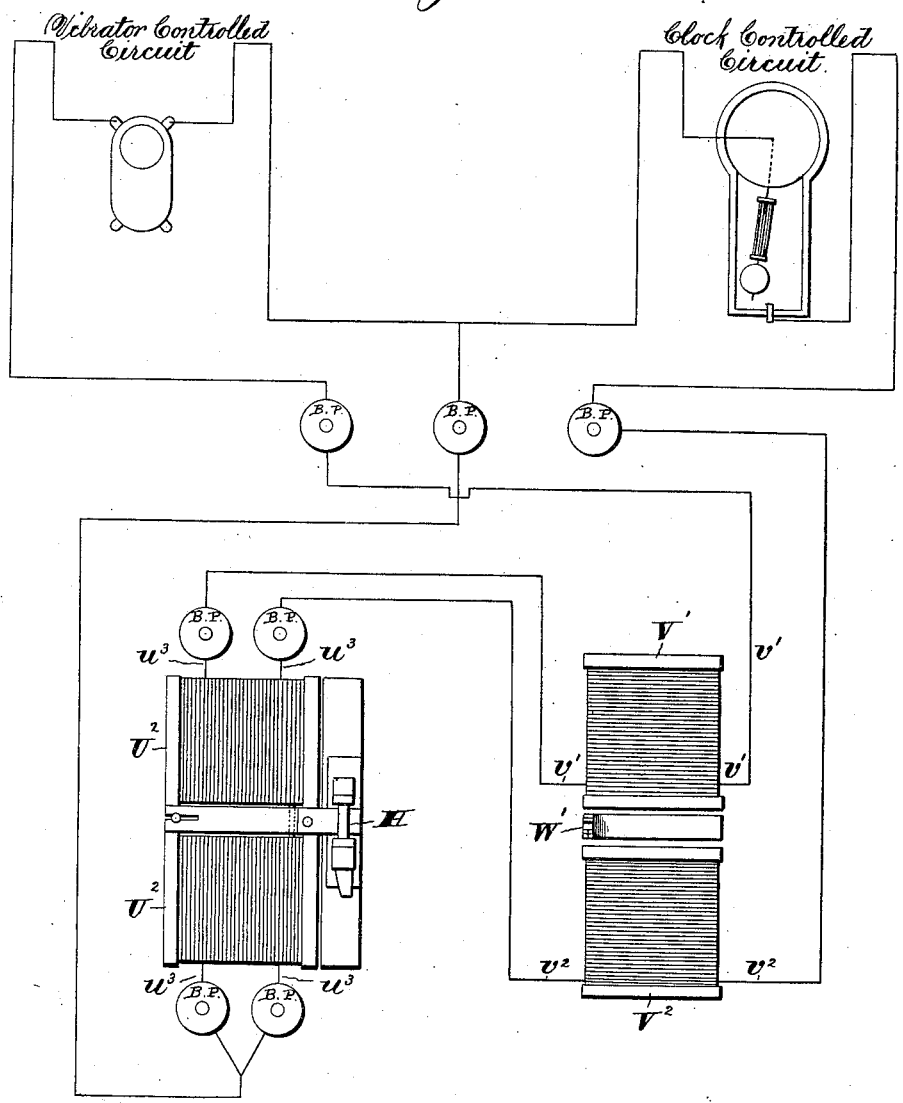

UNITED STATES PATENT OFFICE.

GEORGE E. HUNTER, OF ELGIN, ILLINOIS, ASSIGNOR TO THE ELGIN NATIONAL WATCH COMPANY, OF CHICAGO, ILLINOIS.

RECORDING MECHANISM FOR VIBRATORS FOR TESTING WATCH-BALANCES AND HAIR-SPRINGS.

SPECIFICATION forming part of Letters Patent No. 566,177, dated August 18, 1896.

Application filed May 29, 1896. Serial No. 593,635. (No model.)

*To all whom it may concern:*

Be it known that I, GEORGE E. HUNTER, of Elgin, in the county of Kane, and in the State of Illinois, have invented certain new and useful Improvements in Recording Mechanism for Vibrators for Watch-Balances and Hair-Springs; and I do hereby declare that the following is a full, clear, and exact description thereof, reference being had to the accompanying drawings, in which—

Figure 1:
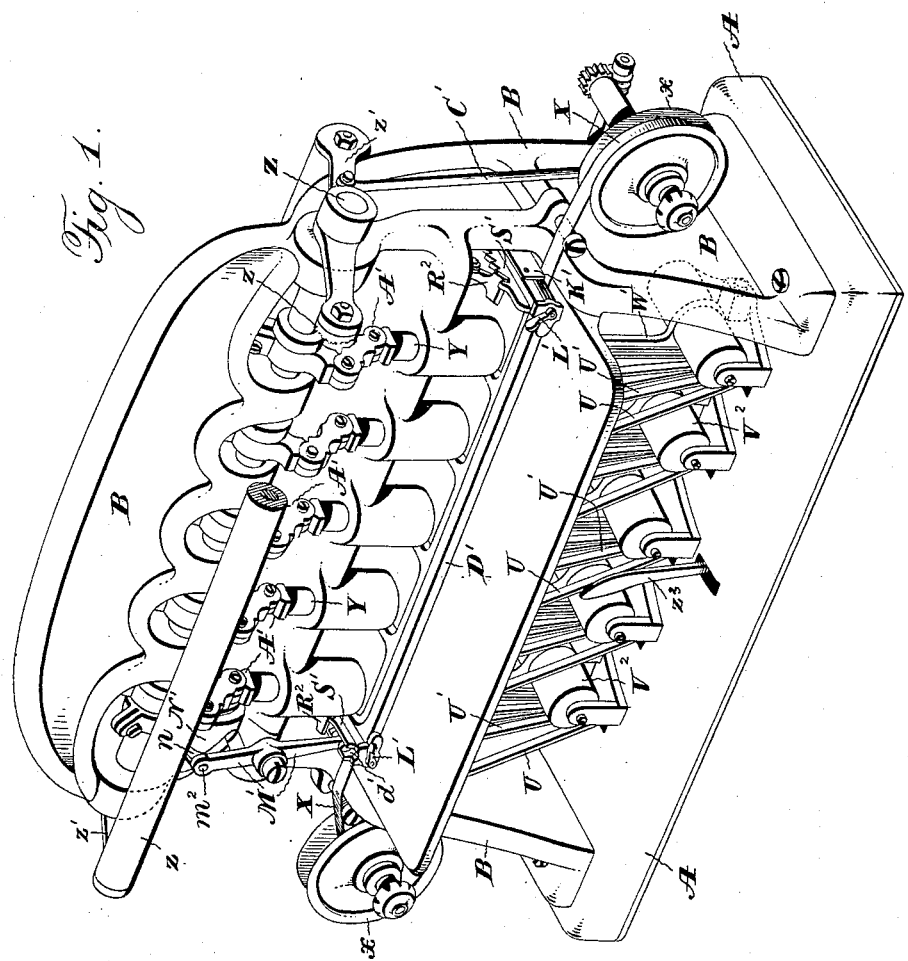
Figure 2:
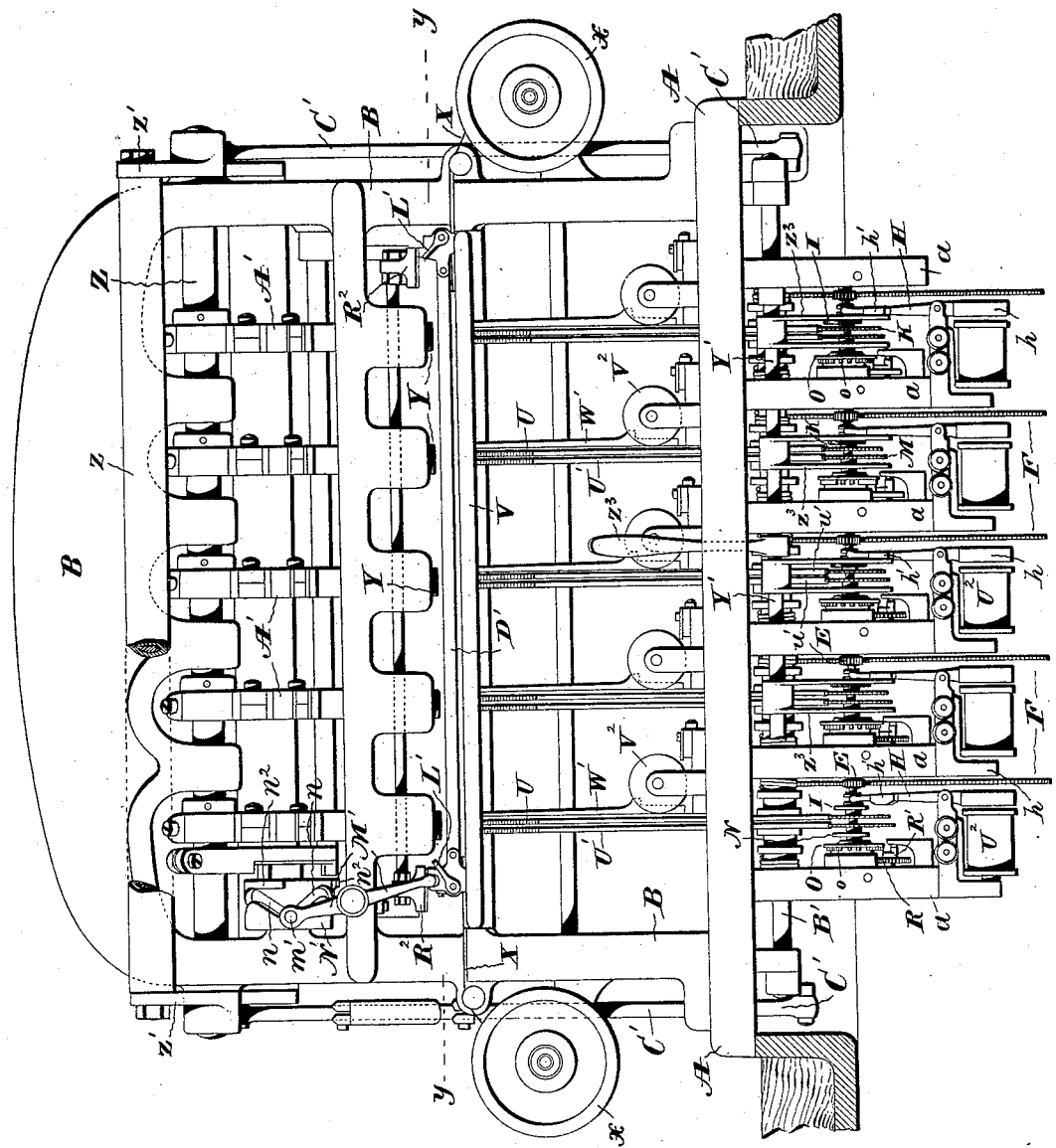
Figure 3:
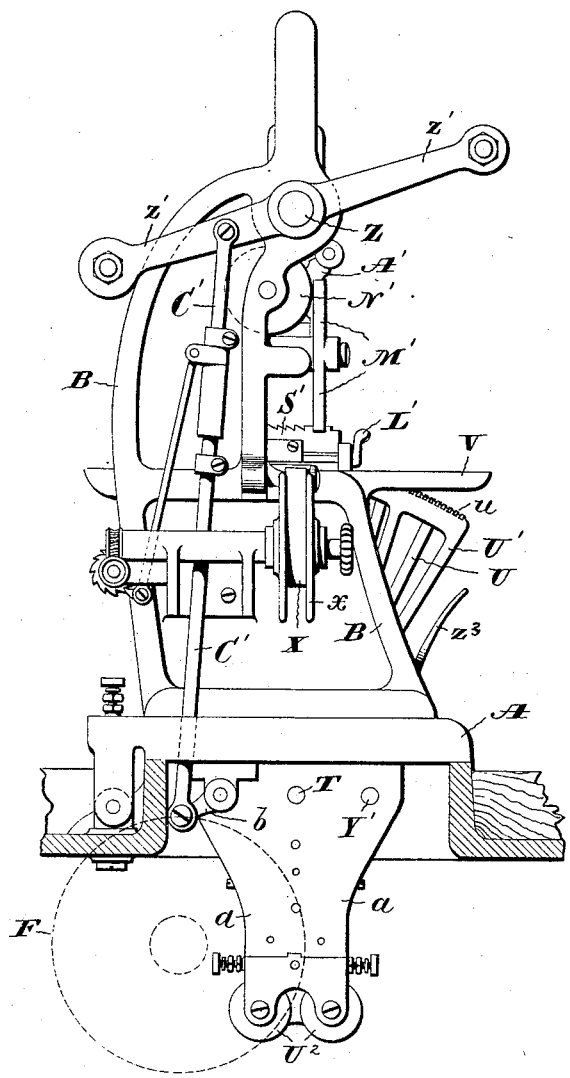
Figure 4:
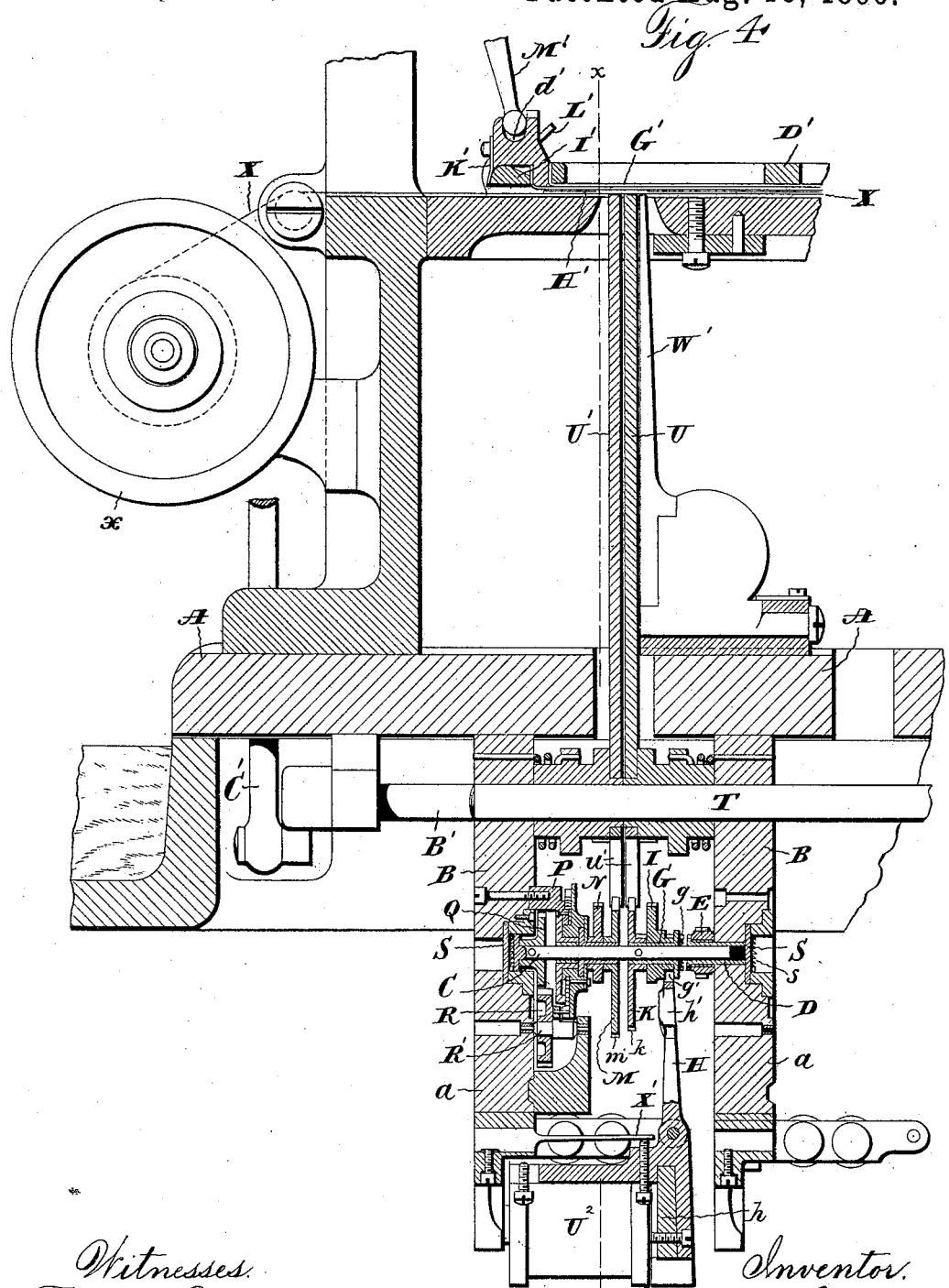
Figure 5:
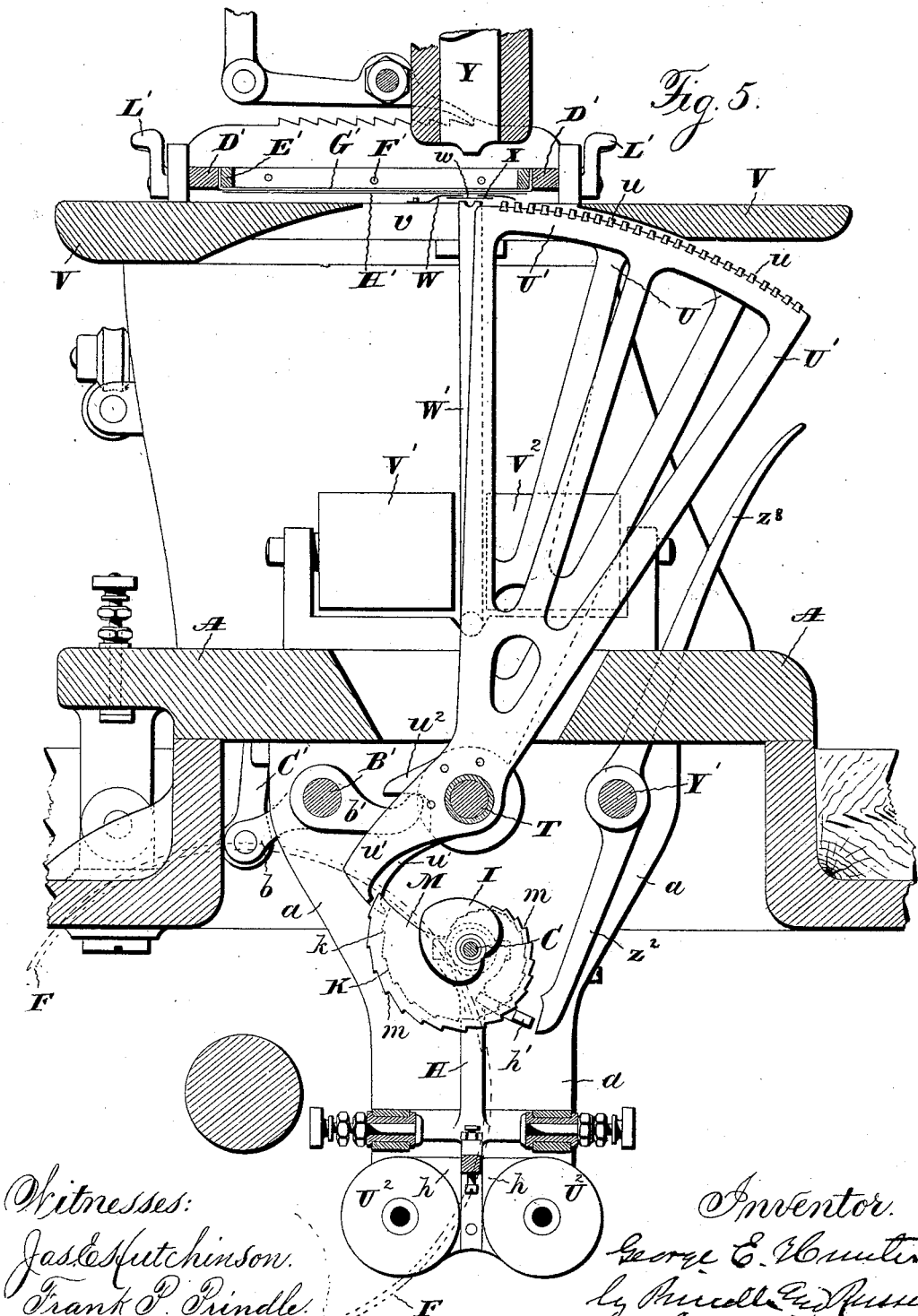
Figure 6:
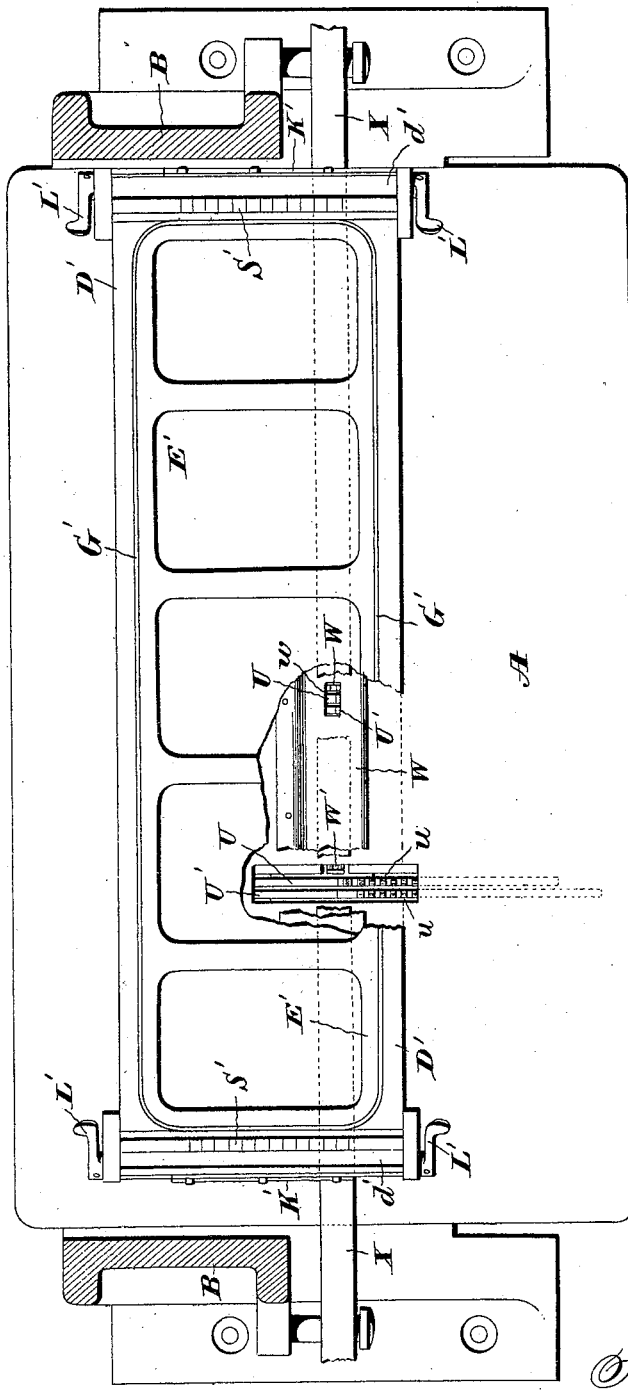

Figure 1 is a perspective view of my mechanism as arranged for use. Fig. 2 is a front elevation of said mechanism. Fig. 3 is an elevation from the left-hand end. Fig. 4 is a vertical longitudinal section of a portion of the mechanism. Fig. 5 is a vertical section on the line $xx$ of Fig. 4. Fig. 6 is a longitudinal section on the line $yy$ of Fig. 2. Fig. 7 is an enlarged, longitudinal, and vertical section of one of the cam-shafts and its connected and adjacent parts. Fig. 8 is a section on the line $zz$ of Fig. 7. Fig. 9 is a detail view, in section, of the paper-shifting mechanism. Fig. 10 is a perspective view of the tape-carrying segments; Fig. 11, a like view of the upper end of the plus and minus carrying bar. Fig. 12 is a diagrammatic view showing the electrical connections between one set of magnets of the mechanism and the vibrator and the clock-controlled circuits.

Letters of like name and kind refer to like parts in the several figures.

The present invention relates to mechanism for testing watch-balances and hair-springs, and has for its object the substitution for the register or indicator, comprising a dial and hands, shown in my Patents No. 484,797, issued October 25, 1892, and No. 490,202, issued January 17, 1893, of an apparatus capable of making a printed or permanent record; and to this end said invention consists in the mechanism having the construction substantially as and for the purpose hereinafter specified.

In the carrying of my invention into practice I employ a frame which consists mainly of a rectangular plate A, that forms the base, and a yoke-shaped part B, which has the general form shown and is secured at its ends to or upon the ends of such base. Secured to and depending from the lower face of the base is a number of lugs $a$, $a$, and $a$, preferably six, which furnish bearings for a number of shafts C and C, that each extends between and is journaled in two contiguous lugs and is in a line axially with the other shafts.

Journaled upon the projecting end of a bushing D, that surrounds and forms a bearing for one end of each shaft C, is a pinion E, which meshes with and is rotated continuously by a toothed wheel F and upon its outer face is provided with a toothed clutch-face $e$, while upon said shaft adjacent thereto is secured a sleeve G, which is adapted to be moved longitudinally and circumferentially with said shaft. The end of such sleeve adjacent to said clutch-pinion is provided with a clutch-face $g$, that by the longitudinal movement of said sleeve may be caused to engage with or be disengaged from said pinion, so as thereby to enable said shaft to be rotated, when desired, by the rotation of said pinion.

Adjacent to the clutch end of said sleeve G is a circumferential groove $g'$, which receives the forked end of a lever H, that is used to move such sleeve longitudinally. Next to said groove is secured a heart-shaped cam I, the purpose of which will be hereinafter explained, and next to such cam upon the end of said sleeve is secured a snail-cam K, that has upon or within its periphery a series of twenty steps $k$ and $k$, that have regularly-increasing distances from the axis of the sleeve.

Upon the shaft C, near to the inner end of the sleeve G, is a second sleeve L, which has secured to its end a snail-cam M, having twenty-five step-faces $m$ and $m$, and adjacent thereto a heart-shaped cam N similar to the cam I, while at its rear end said sleeve is secured within the face of a disk O, which upon one face is provided with a series of radial teeth $o$. Said wheel O is journaled within a support P, that is secured upon the part B, so as to be capable of rotation while held in position with relation to the length of said shaft. Secured rigidly upon the rear end of said shaft C is a toothed wheel Q, which meshes with a pinion R, that is secured upon a shaft R', that is journaled within suitable bearings, which pinion is provided upon one face with a tappet $r$, that at each rotation of said pinion engages with one of the teeth $o$ of said disk O and moves the same, the sleeve L, and the snail M forward one twenty-fifth of a revolution. As thus constructed, whenever the sleeve G is moved into engagement with the pinion E the rotation of the latter will, through said sleeve, be communicated to the shaft C, and at each rotation of the latter the snail K will be correspondingly rotated, and through the toothed wheel Q, pinion R, tappet $r$, toothed disk O, and sleeve L the snail M will be rotated one twenty-fifth of a revolution.

In use it is intended that the motion of the shaft C and its parts should be instantly arrested, and for such purpose one end of the shaft C is provided with clutch-teeth $c$ and $c$, that are adapted to engage with the teeth $s$ of a clutch-face S, that is rigidly attached to the frame.

Journaled upon a rod T, which extends through the lugs $a$ and $a$, is a number of segments U and U, each of which is provided upon its curved periphery with a series of numerals $u$ and $u$, that are raised above the adjacent surface, so as to form printing faces or type. One of such segments U is located above each snail K, and another segment U' is arranged above the snail M, and each segment is provided with a tailpiece $u'$, which is adapted to bear upon each of the step-faces of its snail whenever such face is brought into line therewith, and is caused so to do by spring-pressure whenever not restrained therefrom. Upon the segment which belongs to the snail K is provided twenty double type commencing with "00" and increasing five numbers each time, ending with "95," while upon the segment connected with the snail M is provided a series of twenty-four type, which commencing with the numeral "1" ends with the numerals "24." As said segments are placed side by side they can, by movements upon their axes, be arranged so as to form any desired combination of numbers from "05" to "2,495," such combinations being governed by the positions of said snails, both circumferential and relative.

Immediately above the segments U and U' is located a table V, which is provided with transverse slots $v$ and $v$, that contain the peripheries of said segments and permit their type-faces to come substantially flush with its face. A little above the face of said table over such slots is secured a strip of thin steel W, which is provided at each slot with an opening $w$, that is slightly larger than the space covered by a row of coinciding type upon the segments beneath, and between such strip and table passes an inked ribbon X, which is wound upon and from two spools $x$ and $x$, located at each end, by any usual means. Above each opening $w$ is a round plunger Y, which works vertically within suitable guides, and at its lower end is adapted to pass into and through said opening and to impinge upon the type beneath. Said plunger is moved longitudinally by means of a rock-shaft Z, journaled above, and a toggle-joint A', which is pivoted at its ends to or upon said parts. An upwardly-projecting handle $z$ affords means whereby said rock-shaft may be turned to cause said plungers to descend, while by the action of a spring said parts are returned to their normal position.

It is desirable that the segments should be held out of contact with the snails until just before the plungers are moved downward, to effect which a shaft B' is journaled in rear of the rod T and is connected with the rock-shaft Z by means of an arm $z'$ upon the latter and an arm $b$ upon said shaft B' and a rod C' pivoted to and extending between such arms. In a line with each segment is a curved arm $b'$, which extends forward, and when the plungers are raised engages with a lug $u^2$ on such segment and holds the latter at the extreme limit of its outer motion. When said rock-shaft Z is turned to move the plungers downward, said rock-shaft B' is moved sufficiently to release said segments and permit their tailpieces to impinge upon the steps of their snails before said plungers have moved downward sufficiently to in any manner interfere with the movement of said segments. Upon the opposite movement of said rock-shaft Z said segments are promptly moved to and locked in position out of contact with their snails.

A printed separable record of the type which coincide with each plunger-opening is obtained upon paper by the following-described means, viz: Resting upon the table V is an open rectangular frame D', which is provided with a plate E', that fits into and substantially fills the open center of such frame and is held therein by means of a number of screws F' and F', which pass horizontally through the latter and into said plate. Between the contiguous edges of said frame and plate is a sufficient space to contain the edges of a sheet of rubber or felt G', which latter is stretched over the lower face of said plate before the same is placed in position, and is thus held securely in place.

The elastic sheet G' is intended to perform the office of the blanket of a printing-press, and below such sheet is stretched a sheet of paper H', which at each end turns upward and is secured firmly in place by means of a horizontally-pivoted block I', that when turned to position impinges upon said paper and is held in engagement therewith by the spring K'. A lever L', secured to one of the pivotal bearings of said block, enables it to be turned against the pressure of the spring, so as to release the paper.

Within one end of the frame D' is a groove $d$, which extends from near the front edge to a point near the rear edge and receives one end of a lever M', that from thence extends upward and is pivoted centrally upon the yoke B. The upper end of said lever is provided with a stud $m'$, which projects rearward into a zigzag groove $n$, that is formed in the periphery of a cylindrical cam $N'$, which cam is journaled upon one end of the rock-shaft Z and is given a step-by-step rotation by means of an arm $O'$, that projects rearward from said rock-shaft, a pawl $o'$, pivoted upon the end of such arm, and a ratchet-wheel upon one end of said cam which is engaged by said pawl. As thus arranged at each partial rotation of said rock-shaft in the direction necessary to move the plungers Y downward said pawl trips over one of the ratchet-teeth $n'$, while upon the reverse movement of said rock-shaft said pawl engages one of said ratchet-teeth and gives to said cam one-sixth of a revolution, and through the action of the cam-groove $n$ and lever $M'$ moves said frame $D'$ longitudinally to the limit of its motion in one direction.

After the frame $D'$ has been moved longitudinally in one direction and a record printed it is automatically moved forward the necessary distance for the printing of a new line by means of a bell-crank $P'$, which is secured upon one end of a shaft $Q'$, that is journaled in and extends lengthwise of the yoke B, three cam-faces $n^2$, $n^2$, and $n^2$, formed upon the periphery of the cam $N'$ and engage with the end of the upper arm of said bell-crank, a pawl $R^2$, which is pivoted to and extends forward from the end of the lower arm of said bell-crank, a toothed rack $S'$, that is secured transversely upon the upper side at the end of said frame $D'$ and adapted to be engaged by said pawl, and a spring $T'$, which operates to hold said bell-crank arm with a yielding pressure in engagement with said cam. The relative arrangement of the groove $n$, ratchet-teeth $n'$ and $n'$, and cam-faces $n^2$, $n^2$, and $n^2$ is such as to cause the paper to be moved longitudinally the length of a printed record at each upward movement of the plungers and to be moved forward the width of a printed line of records every second upward movement of said plungers, the result being such presentation of the paper as to cause it to be covered in regular order with the records of the vibrations of balances or hair-springs. In order that the action of the mechanism for moving the paper forward may be rendered certain, the pawl-and-ratchet mechanism described is duplicated, so that each end of the paper-carrier is simultaneously moved.

The lower end of the lever H carries an armature $h$, which is moved by means of an electromagnet $U'$, which preferably has each coil $u^3$ and $u^3$ made double, so that when currents of electricity having equal strength are passing at the same time and in opposite directions through each wire they will neutralize each other and produce no magnetism; but if one current is interrupted then the other current will act with full effect, and the armature will be attracted, and when thus attracted will operate to move the clutch-sleeve G into engagement with the pinion E, and thus set in motion the recording mechanism. This construction and operation is similar to what is shown and described in my hereinbefore-referred-to patent, No. 490,202. As in said patent, one of the electric circuits to the coils $u^3$ and $u^3$ is controlled by a standard clock and is closed at the expiration of a predetermined interval of time, preferably one minute, while the other circuit is controlled by the vibrator mechanism and is closed when the balance or spring being tested has made the number of vibrations that a perfect balance or spring would make in such interval. If, therefore, the balance or spring being tested is perfect, the two circuits will be closed simultaneously. If it be slow, then the vibrator-controlled circuit will be closed after the closing of the clock-controlled circuit, while if it be fast the vibrator-controlled circuit will be closed first.

In order that the printed record may show which of the two currents sets the registering mechanism in operation, there are located upon the base A, adjacent to each pair of printing-segments, two electromagnets $V'$ and $V^2$, between which is pivoted a bar $W'$, that extends upward beside and to the same height as the segments U and $U'$ and upon its upper end is provided with two type-characters, preferably $+$ and $-$, which are each adapted to print upon the record-paper, and by a slight movement of said bar upon its pivotal bearing may be brought into position for impingement by the plunger Y. One of the coils $v'$ or $v^2$ of said magnets forms part of the clock-controlled circuit, while the other coil forms part of the vibrator-controlled circuit, so that the circuit first closed will cause the bar $W'$ to be moved into position to present the proper character for printing, while if the circuits are simultaneously closed said bar will maintain a normal mid-position and the printed record show neither fast nor slow. When both circuits are closed, the magnetism of the magnets $U'$ is destroyed and the clutch-sleeve G is, by the action of the spring $X'$, moved to the opposite limit of its motion to perfect the setting of the snails and lock the same in place.

After a record has been printed the recording mechanism is set at zero for a new record by means of a shaft $Y'$, that is journaled at the front of and below the base A and is provided with a series of arms $z^2$ and $z^2$, that by the partial rotation of such shaft may be pressed upon and caused to turn the heart-shaped cams I and N, and with the latter the sleeves to which they are attached. Before such action is had, however, it is necessary to release said sleeves from engagement with the clutch-face S, and such is effected by forming upon the side of the lever H a cam projection $h'$, which is engaged by the contiguous arm $z^2$, so as to move said lever to a position midway between the extremes of motion and leave the segments free to be turned to zero. A handle $z^3$, secured to and projecting upward from said shaft, enables it to be readily turned, as described.

Having thus described my invention, what I claim is—

1. The combination with means for vibrating a balance or hair-spring, and a standard timepiece, of printing recording mechanism, and connections between each of the former and said printing mechanism, whereby they may control the latter, substantially as and for the purpose specified.

2. The combination with a balance or hair-spring vibrator, and a standard timepiece of a printing recording mechanism common to both, and connections between each of the former and the latter, whereby the printing position of said mechanism can be controlled by either, substantially as and for the purpose described.

3. The combination with a balance or hair-spring vibrator and a standard timepiece, of a printing recording mechanism whose type-characters are carried by moving parts, and electrical connections between said vibrator and said standard timepiece and the recording mechanism whereby each of the former may control the movements of the type-carrying parts of the latter, substantially as and for the purpose set forth.

4. The combination with a pivoted type-carrying part of a printing mechanism, of a rotary snail to fix the printing position of said part, and means to hold said part free from the snail substantially as and for the purpose shown.

5. The combination with a pivoted type-carrying part of a printing mechanism, of a rotary snail to fix the printing position of said part, means to rock the latter to move it into and out of contact with the snail, and an electromagnet for connecting said snail with a constantly-moving part, substantially as and for the purpose specified.

6. The combination with a pivoted type-carrying part of a printing mechanism, of a rotary snail to fix the printing position of said part, a doubly-coiled electromagnet, adapted to be traversed by opposing currents, an indicator, and two magnets to oppositely move the latter, each of the latter magnets being in circuit with one of the coils of said doubly-coiled magnet, substantially as and for the purpose described.

7. The combination with the two pivoted type-carrying parts of a printing mechanism, of a rotary snail for each part, a clutch mechanism to connect both snails to a constantly-moving part, and an electromagnet to operate said clutch mechanism, substantially as and for the purpose set forth.

8. The combination with a movable type-carrying part of a printing mechanism, of means to move the same, a device to fix the printing position of said part, a plunger or like part to give the impression, a stop to hold said type-carrying part against movement until a predetermined time, and means to move said stop into and out of engagement with such part, substantially as and for the purpose shown.

9. The combination with a movable type-carrying part of a printing mechanism, of means to move the same, a device to fix the printing position of said part, a plunger to give the impression, a stop to hold said type-carrying part against movement that is movable into and out of engagement therewith, means to move said plunger, and connections between the same and said stop to move the latter when the plunger is moved to give an impression, substantially as and for the purpose specified.

10. The combination with the pivoted type-carrying part of a printing mechanism, of a rotary snail to fix the printing position of said part, a plunger to give the impression, a pivoted arm to engage a projecting portion of the type-carrying part, and a lever connected with said arm and with the plunger, substantially as and for the purpose described.

11. In a printing mechanism, the combination with the printing devices, of the holder for the impression-receiving surface, and means to move said holder alternately longitudinally and laterally, substantially as and for the purpose set forth.

12. In a printing mechanism, the combination with the printing devices, of a frame adapted to carry the impression-receiving paper, and means to move said frame, alternately longitudinally and laterally, substantially as and for the purpose shown.

13. In a printing mechanism, the combination with the printing devices, of the holder for the impression-receiving paper, the cam-actuated lever for imparting movement thereto in one direction, and the pawl-and-ratchet mechanism for moving such holder in another direction, substantially as and for the purpose specified.

14. The combination with the two snails, of means to rotate them at different rates of speed, a shaft on which said parts are mounted, a clutch to connect said shaft to a constantly-rotating pinion, a clutch to connect said shaft to a relatively-fixed part, and means to move said shaft longitudinally to alternately change the engagement of said clutches, substantially as and for the purpose described.

In testimony that I claim the foregoing I have hereunto set my hand this 22d day of May, 1896.

GEORGE E. HUNTER.

Witnesses:
CARLOS H. SMITH,
MORTIMER M. CLOUDMAN.